(12) United States Patent
Westergaard Andersen

(10) Patent No.: US 11,300,191 B2
(45) Date of Patent: Apr. 12, 2022

(54) MULTI PART SPROCKET WHEEL

(71) Applicant: Ammeraal Beltech Modular A/S, Vejle (DK)

(72) Inventor: Kenneth Westergaard Andersen, Vejle (DK)

(73) Assignee: Ammeraal Beltech Modular A/S, Vejle (DK)

(*) Notice: Subject to any disclaimer, the term of this patent is extended or adjusted under 35 U.S.C. 154(b) by 575 days.

(21) Appl. No.: 16/322,520

(22) PCT Filed: Aug. 1, 2017

(86) PCT No.: PCT/DK2017/050255
§ 371 (c)(1),
(2) Date: Feb. 1, 2019

(87) PCT Pub. No.: WO2018/024307
PCT Pub. Date: Feb. 8, 2018

(65) Prior Publication Data
US 2022/0025964 A1    Jan. 27, 2022

(51) Int. Cl.
*F16H 55/12* (2006.01)
*B65G 23/06* (2006.01)
*F16H 55/17* (2006.01)

(52) U.S. Cl.
CPC .......... *F16H 55/12* (2013.01); *B65G 23/06* (2013.01); *B65G 2207/30* (2013.01); *F16H 55/171* (2013.01); *F16H 2055/175* (2013.01)

(58) Field of Classification Search
CPC .. F16H 55/12; F16H 55/171; F16H 2055/175; B65G 23/06; B65G 23/00; B65G 2812/02306; B65G 2207/30

USPC ............................................. 198/834; 474/96
See application file for complete search history.

(56) References Cited

U.S. PATENT DOCUMENTS

| 5,833,562 | A | * | 11/1998 | Walker, Sr. | ............. | F16H 55/30 |
| | | | | | | 474/96 |
| 6,074,316 | A | | 6/2000 | Murrietta, Sr. | | |
| 6,719,127 | B2 | * | 4/2004 | Depaso | ................. | B65G 17/08 |
| | | | | | | 198/834 |
| 9,097,332 | B2 | * | 8/2015 | Li | ........................ | F16H 55/12 |
| 10,238,035 | B2 | * | 3/2019 | Walters | ................ | F16H 57/035 |
| 2005/0199471 | A1 | * | 9/2005 | Barrett | ................... | B65G 45/10 |
| | | | | | | 198/495 |

(Continued)

FOREIGN PATENT DOCUMENTS

| EP | 0333309 A1 | 9/1989 |
| EP | 1719718 A2 | 11/2006 |
| GB | 2481847 A | 1/2012 |

*Primary Examiner* — James R Bidwell
(74) *Attorney, Agent, or Firm* — James Creighton Wray

(57) ABSTRACT

A multipart sprocket wheel engages modular belt modules in a conveyor belt. Each multipart sprocket wheel has two or more periphery elements. Each element has an outer edge and an inner edge. Sprocket teeth are provided on the outer edge. The inner edge has an engagement surface. Each element has fasteners for being fastened to an adjacent periphery element. Two or more periphery elements' outer edges form a full circle. One or more adapter members are used. Each adapter member has an outer face and an inner face. The outer face firmly engages the inner edge of one or more periphery elements. The inner face engages a conveyor drive axle.

8 Claims, 4 Drawing Sheets

(56) References Cited

U.S. PATENT DOCUMENTS

2007/0161443 A1 7/2007 Krisl
2010/0273592 A1 10/2010 Curley

* cited by examiner

MULTI PART SPROCKET WHEEL

This application claims the benefit of Danish Application No. PA 201600458 filed Aug. 2, 2016 and PCT/DK2017/050255 filed Aug. 1, 2017, International Publication No. WO 2018/024307 A2, which are hereby incorporated by reference in their entirety as if fully set forth herein.

The present invention discloses a multi part sprocket wheel suitable to engage conveyors assembled from a plurality of substantially identical modular belt links.

The endless conveyor belt is typically arranged around two axles, one in either end of the conveyor. Additional support axles may be provided between the ends of the conveyor. In order to transfer the propulsion force from the drive axle to the conveyor belt, in order to create movement of the conveyor, at least one axle is powered and provided with one or more sprocket wheels. The sprocket wheels will typically have teeth which engages the underside of the conveyor belt, and hence the modular belt links. In order to make the belt run smoothly the engagement between the sprocket wheel and the modular belt links is very important. Due to the many different conveyor belt constructions the sprocket wheels also varies as does the engagement teeth on the sprocket wheels. Furthermore the many different modular belt modules also require different sprocket wheels.

EP 1719718 discloses a multi part sprocket wheel, presenting two halves assembled around a hub. The hub itself may be in two parts also, making it possible to assemble the sprocket wheel around the axle, and not having to slide the sprocket wheel over and down the axle. In order to retain the sprocket wheel in its proper position in the axial direction on the drive axle it is necessary to clamp the two halves together, providing a holding force on the axle, such that the sprocket wheel does not wander axially during use, whereby the sprocket wheel will come out of line and be severely damaged.

When using sprocket wheels made from plastics, which is standard in connection with conveyor belts assembled from modular belt links, it is disadvantageous to create constant tension in the plastic parts, as this will over time cause failure. If tension is to be achieved, the plastics must be modified for example by fibers and the like. Such modifications in addition to being expensive also requires a much more complex and complicated manufacturing process, than simple injection molding using for example POM.

A similar example is known from U.S. Pat. No. 5,833,562. In this construction the sprocket wheel is assembled from two halves. The halves define a central opening having a tapered cross-section in the axial direction of the drive axle onto which the sprocket wheel is to be mounted. A fastening clamp in two parts is thereafter inserted into the central opening. The clamp has a corresponding tapered outer surface. As the clamp is inserted into the central opening the two parts will wedge together, thereby fastening the sprocket wheel to the drive axle. This wedging action is maintained by bolting the two parts together in the axial direction.

The same disadvantages as mentioned above with respect to EP1719718 are also present in this construction.

Neither of U.S. Pat. No. 5,833,562 nor EP 1719718 are able to "float" on the drive axle, as will be discussed below.

Another aspect is when a conveyor construction is renovated or replaced by modules from a different provider. In most such cases it will also be necessary to replace the sprocket wheels in order for the sprocket wheels' teeth to engage the belt modules in a smooth manner. This will often necessitate that the entire substructure needs to be replaced.

A further consideration is the fact that smooth running of the conveyor is further facilitated by the constant adjustment of the sprocket teeth's engagement to the underside of the conveyor belts modules. In the underside of these types of modules are provided designated positions were the sprocket teeth shall engage the modules and provide the driving force. Depending on the design of the conveyor belt modules the distance between these designated positions varies, both longitudinally in the conveyor belts travelling direction but also laterally. The designated positions are specifically designed to receive the teeth provided on the sprocket wheels, such that the designated positions may to a certain degree guide the sprocket teeth, but the designated positions are also designed such that they are able to transfer the driving force securely to the conveyor belt. In order to achieve this it is customary to allow the sprocket wheels to float on the axle, such that a certain degree of lateral movement (movement in the longitudinal direction of the axle) is allowed. This however causes extra wear, and in many applications the floating movement can give the exact opposite effect, namely that the teeth of the sprocket wheel does not engage in the designated correct position on the modular belt link.

Object of the invention.

The invention addresses these problems and provides further advantages, as will be clear when reading the claims and the appended description in combination with the enclosed drawing.

Consequently the invention provides a multipart sprocket wheel adapted to engage modular belt modules in a conveyor belt, where said multipart sprocket wheel comprises: two or more periphery elements, each element having an outer and an inner edge, where sprocket teeth are provided on the outer edge, and where the inner edge has an engagement surface, and where each element has means for being fastened to and adjacent periphery element, such that the two or more periphery elements outer edges forms a full circle; one or more adapter members where each of said adapter members has an outer and an inner face, said outer face suitable to firmly engage the inner edge of one or more periphery elements, and said inner face adapted to engage a conveyor drive axle.

With this multi-part system, which is assembled to a suitable sprocket wheel, a number of advantages are achieved.

A first aspect is the ability to assemble the sprocket wheel in situ on the axle. Typically a plurality of sprocket wheels will be arranged on each axle in order to provide a homogeneous transfer of power from the driven sprocket wheel to the modular conveyor belt. Typically the sprocket wheels are arranged on the axle before mounting the axle in the conveyor sub-structure. If a sprocket breaks or fails, it is necessary to replace the sprocket wheel. With the prior art, replacement is only possible by withdrawing the entire axle, and thereafter replace the damaged sprocket wheel. With the present invention it is possible to replace the sprocket wheel in situ, without dismantling the sub-structure. This results in much less down-time. In this connection the advantage is even more pronounced in cases where many conveyor structures are arranged next to each other as is often the case in larger production facilities. In such cases it is nearly impossible to access and dismantle an entire axle in order to replace a sprocket wheel, without seriously interfering with the entire production.

A further aspect is that due to the provision of the adapter members, a limited number of periphery elements and adapter members are necessary in order to be able to assemble a sprocket wheel for nearly any combination of conveyor belt and axle construction. Typically the same size of conveyor belt modules will be built into conveyor structures having the same turning radiuses around the sprocket wheel. In this manner a limited number of periphery elements are needed in order to fit same size conveyor belt modules, and the same is true with respect to the various dimensions of drive axles for which the adapter members needs to fit.

And in a further advantageous embodiment the multipart sprocket wheel is further characterized in that the sprocket teeth are arranged in a common plane, and that the one or more adapter members extends in a direction orthogonal to the common plane of the sprocket teeth, optionally on both sides of said common plane.

The extend outside the plane, limits how close adjacent sprocket wheels can be operated. On the other hand, the extend also ensures that a proper distance is maintained. It is, as already mentioned above important that the teethe of the sprocket wheels engages the appropriate designated positions/locations on the modular belt links in order to assure smooth running, noise reduction, no wobbeling, excessive wear etc. The built in distance keeping means also makes it possible to only fix one or a few of the adapter members laterally to the drive axle, as the neighbouring sprocket wheels will be kept at the proper relative distances by means of the extension of the adapter members in a plane orthogonal to the plane of the teeth of the sprocket wheel. In practice the plane of the teeth is arranged orthogonal to the axis around which the axle rotates, and consequently the extension of the adapter members is parallel to the axle.

In this context it is not possible to define the extend in for examples mm. The extend depends on the design of the conveyor belt modules. Typically modular conveyor belt modules having a rather small pitch (distance between front and rear edge in the driving direction) will tend to have a larger lateral distance between the designated positions. Other influences may be the designated load the conveyor is designed to carry. The higher the load the more force is needed and the closer the sprocket wheels are arranged, making the extend relatively shorter than for lighter loads and/or other pitches.

The skilled person will from experience and by calculating the proper parameters know how many sprocket wheels shall be provided per length drive axle. The adapter members will be chosen accordingly. In practice there is a limited number of more or less standard lateral distances between adjacent sprocket wheels, and the extend of the lateral extension of the adapter members may correspondingly by manufactured and kept in stock corresponding to the desired (standard) lateral distance.

In a still further embodiment of the multi part sprocket wheel the adapter members' inner face is provided with means for fastening the adapter member to the conveyor drive axle.

These means may by grooves provided both in the axle and adapter member, such that a locking piece may be inserted in the grooves as they are aligned, thereby making it impossible for the adapter member (and the entire sprocket wheel) to rotate relative to the axle. As the axle rotates the sprocket wheel will also rotate. This system is typically use with round axles. In some instances the axles have a square or triangular cross-section. For these applications the adapter members will have corresponding shapes, such that as the adapter members are mounted around the axles and the bolts tightened in order to assemble the periphery elements a firm and power transferring connection is created between the adapter members (and thereby the sprocket wheel) and the axle.

In a still further embodiment of the multi part sprocket wheel the means for fastening adjacent periphery elements to each other includes flanges extending orthogonal to the common plane and arranged in both distal ends of each periphery element, where each flange is provided with recesses alternative apertures, suitable to receive and hold a bolt and/or nut.

The flanges provides solid engagement surfaces, which when the bolts are tightened creates stable and solid connections. Furthermore the recesses may hold for example the nuts in bolt/nuts connections, such that during the installation procedure the assembly personnel will only have to handle the bolts and sprocket wheel parts.

The invention is also directed to a multi part sprocket wheel system, comprising:
a selection of periphery elements (10,11) as described above where a plurality of types are provided, where the periphery elements (10,11) are provided in different sizes, such that when one type of periphery elements (10,11) are assembled they form a full circle with one diameter, and when a second type of periphery elements (10,11) are assembled they form a circle with a second diameter and so forth, and where all periphery elements (10,11) has identical inner edges;—
adapter members (20,21) as described above.

In this manner it is possible to create a standardized sprocket wheel system. The personnel operating and maintain these types of conveyor structures will consequently be familiar with the inventive principles of the system, and will recognize the principles of how to assemble the sprocket wheels regardless of the conveyor structure. Furthermore it is feasible to manufacture large numbers of the various components making up the system and keep the storage. It is thereby possible to immediately provide service, and limit the down-time for the conveyor, as the spare parts are at hand and the personnel can fairly easily replace damaged parts.

Further embodiments and inventive details appear from the appended drawing wherein among other features the light parts illustrate the peripheral sprocket elements. In the embodiments illustrated the sprocket elements are illustrated as two parts, i.e. The entire periphery of the sprocket wheel is assembled from two elements. It is contemplated that the peripheral sprocket wheel can be assembled from two, three, four, five, six or more parts. As illustrated the peripheral elements are assembled by means of bolts. When assembled the sprocket teeth are arranged in a common plane. Each peripheral sprocket element is provided with flanges extending away from this common plane, such that for adjacent distal ends of each peripheral sprocket wheel segment it is possible to assemble adjacent elements by means of bolts.

Before assembling the peripheral sprocket segments, adapter members are inserted—in the drawings the darker parts. These adapter members may be fitted to the peripheral elements by matching ridges/grooves provided on the adapter elements and peripheral elements respectively. Once the adapter members are slid in relative to the peripheral elements and the bolts mounted, a single rigid unit is the result.

The adapter members are on an inner face provided with a geometry such that the assembled multi part sprocket wheel may be mounted on a conveyor belts drive axle as illustrated in further FIGS. 8 and 9.

The inner geometry of the adapter member may have a geometry fitting to the drive axle. As Illustrated it may be square or round depending on the feature of the actual drive axle.

As shown in detail in FIGS. 4 and 5 the bolt assembly includes embedded nuts and holders 27 for the bolts 25 to facilitate the assembly on site. The adapter members are intended for being fitted around a circular axle. Engagement ridges correspond to engagement grooves on the axle. Locking members between the sprocket wheels and the drive axle may be inserted.

The adapter members will have an extend orthogonal to the plane to the common plane of the sprocket teeth, such that they will work as distance keepers, keeping the sprocket wheels at the correct mutual distance when mounted on an axle, and still have a floating capability.

The adapter members may be provided with an aperture such that it is possible for example by means of a bolt, to fasten the adapter member relative to the drive axle there by at least fixate one or more multi-part sprocket Wheels on the axle, and retain the floating mounting of the other multi part sprocket wheels.

This aspect is also illustrated in more detail on the FIGS. 8 and 9 in which a plurality of multipart sprocket wheel members are arranged around a square axle and a central adapter member is fixated to the axle.

DETAILED DESCRIPTION OF PREFERRED EMBODIMENTS

Figure 1:
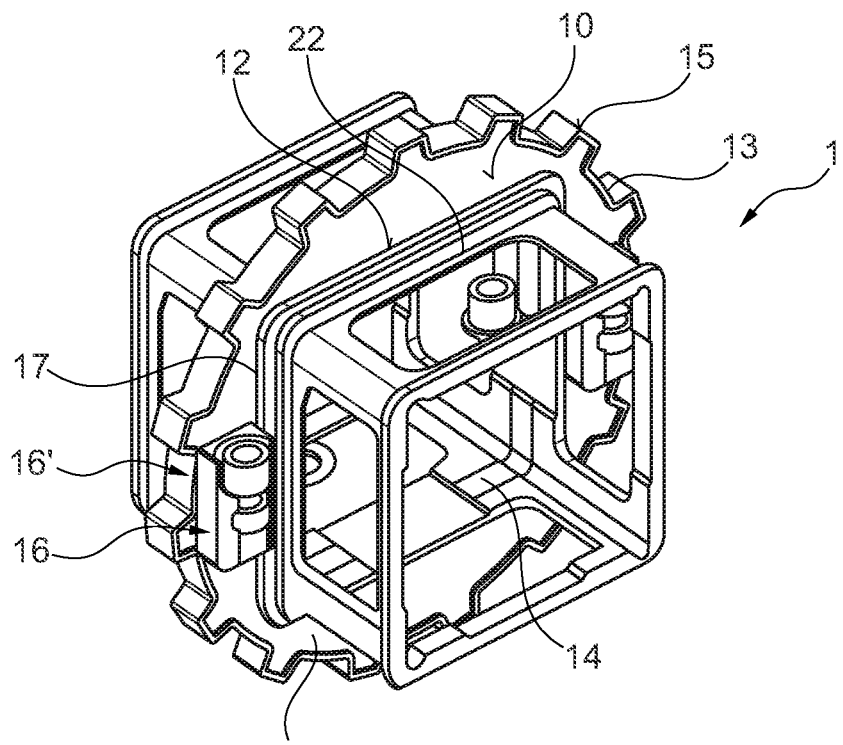
FIGS. 1 and 2 illustrate embodiments of assembled multipart sprocket wheels according to the invention.
Figure 2:
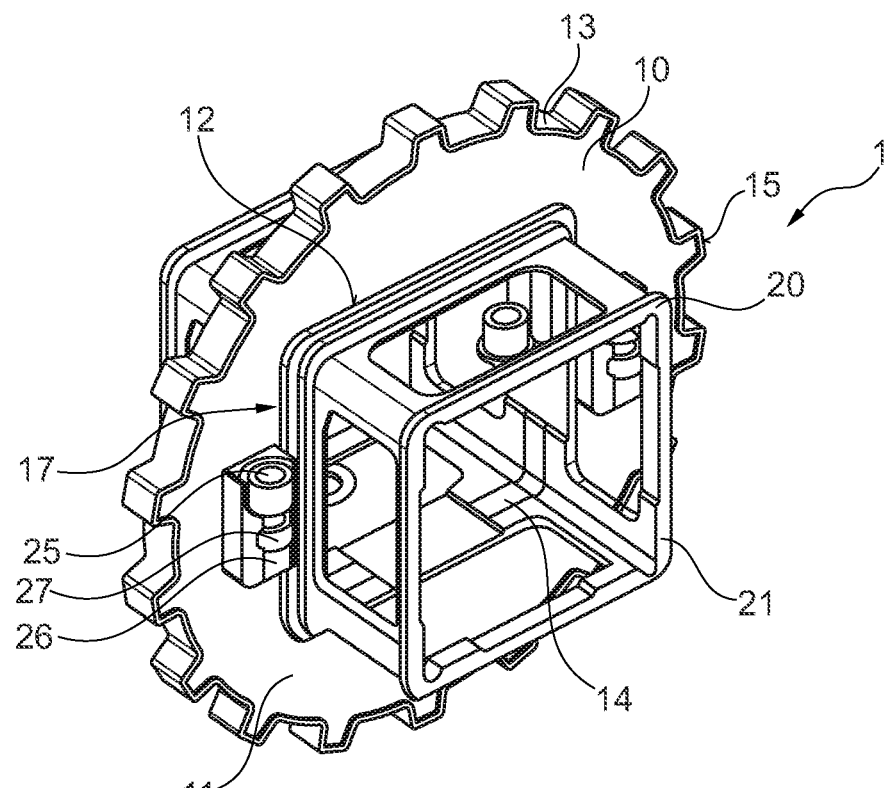

In FIGS. 1 and 2 are illustrated two different embodiments of the multipart sprocket wheel according to the invention.

In both examples the sprocket wheel 1, comprises two periphery elements 10,11. Each periphery element 10, 11 has an inner edge 12 and an outer edge 13. The inner edge 12 is partly hidden by a flange 22 on an adapter member 20,21.

On the outer edge 13 of the periphery elements 10,11 are provided a plurality of sprocket teeth 15. The sprocket teeth 15 are designed to be able to engage the underside of a modular conveyor belt, assembled from a plurality of substantially identical modular belt links. Such conveyor belts are well known in the art, and may be supplied from a host of manufactures such as for example Ammeraal Beltech Modular, Intralox or Habasit to mention but a few.

Figure 3:
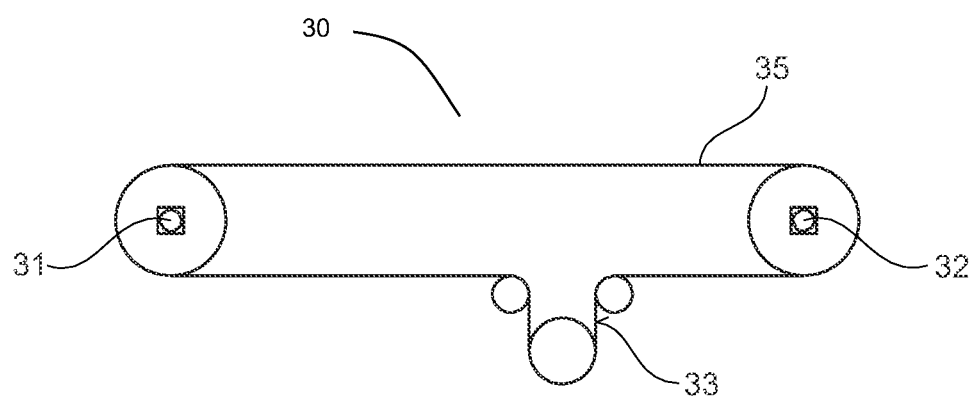
FIG. 3 schematically illustrates a conveyor structure.

In order for the multipart sprocket wheel 1 to be mounted in a conveyor structure 30, see FIG. 3, the multipart sprocket wheel 1 is provided with adapter members 20,21. The adapter members 20,21 will when assembled, be able to fit on the outside of the conveyor structure's drive axle 31,32 (and any idle axles as well). Typically only one axle will be a drive axle 31 where the other axle 32 will be an idle axle.

In the conveyor structure 30 illustrated in FIG. 3 the conveyor belt 35 also travels through a (simplified) belt tightening arrangement 33.

Often the axles 31,32 will have a square cross-section, in order to transfer the propulsion force from the axles 31,32 to the sprocket wheels 1. For this purpose the adapter members 20,21 will when assembled in the embodiment illustrated in the figures have a corresponding cross-section, such that the propulsion force may be transmitted from the axles 31,32 via the adapter members 20,21 to the periphery elements and to the conveyor belt (see FIG. 3).

The adapter members has outer faces 17 suitable to firmly engage and retain the inner edge 12 of the periphery elements 10,11. In the illustrated embodiment this firm engagement is further reinforced by the provision of flanges 22 adjacent the inner edge 12, where the flanges 22 are spaced in order to be able to receive the inner edge 12 of the periphery element 10,11 between two flanges 22, i.e. the distance between the flanges corresponds to the thickness of the periphery elements 10,11. This is more clearly illustrated in FIGS. 6 and 7.

Figure 4:
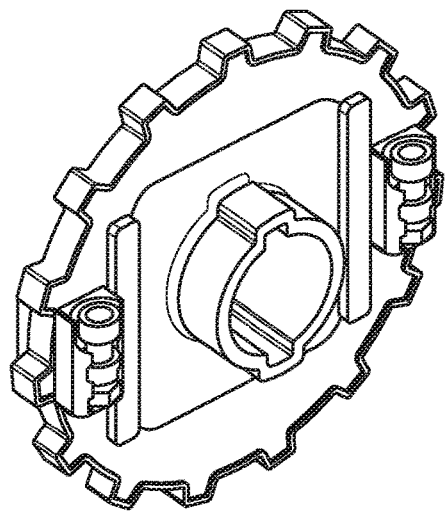
FIGS. 4 and 5 illustrates details relating to the assembly features provided in the distal ends of the periphery elements in order to assemble the periphery elements.
Figure 4:
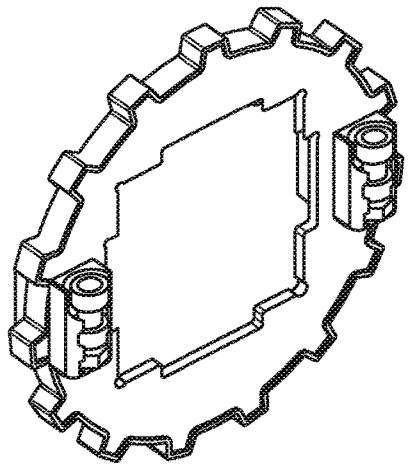
Figure 4:
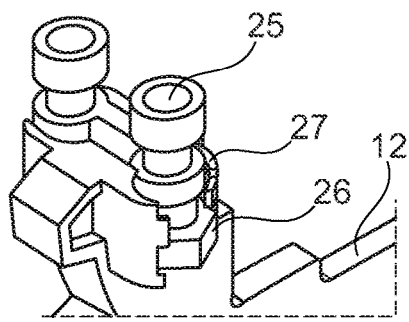
Figure 5:
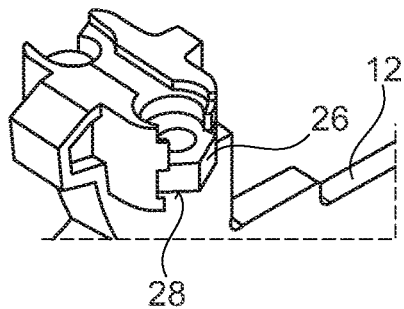

The periphery elements 10,11 are in this embodiment assembled by bolts 25 and nuts 26. In order to further stabilize and strengthen the connection a bone element 27 is arranged. The bone element 27, see also FIG. 4 is provided with an aperture in either end of the element for allowing and guiding the bolts 25 to pass through to the nuts 26. A bolt 25 and nut 26 arrangement is arranged on either side of the periphery elements 10,11, such that by tightening the bolts 25 and nuts 26 the periphery elements 10,11 will be forced into a tight and secure engagement (surrounding the adapter members 20,21). The bone element 27 will further stabilize this connection by maintaining the distance between the bolts 25, thereby making sure that the periphery elements 10,11 are not allowed to misalign or otherwise move relative to each other.

In the illustrated embodiments the nuts 26 are fitted in a recess 28 cast into the periphery elements 10,11. It is however clear that the recesses are provided for convenience—easing assembly and disassembly. The periphery elements may be manufactured without these recesses.

Figure 6:
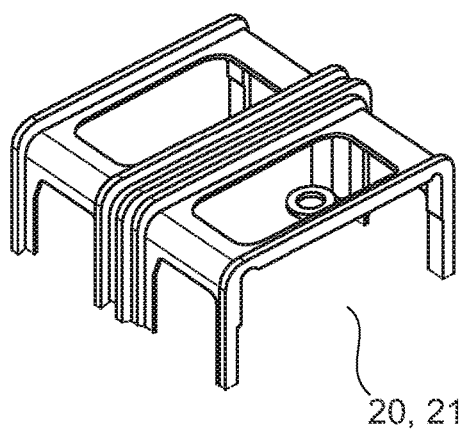
FIGS. 6 and 7 illustrates embodiments of the adapter member.
Figure 7:
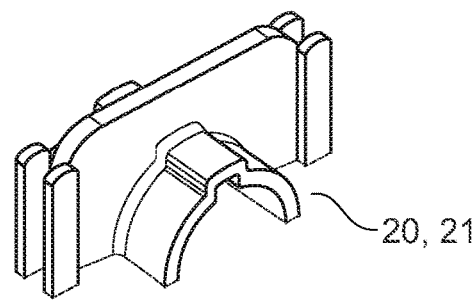

In FIGS. 6 and 7 are illustrated examples of adapter members 20,21. In the illustrated example both adapter members may accommodate periphery elements with the same inner periphery 12. Due to the inner periphery construction of the adapter members 20,21 in FIGS. 6 and 7 they are suitable to be mounted on different axles. The adapter member in FIG. 6 is suitable to be mounted around an axle having a square cross-section, whereas the adapter in FIG. 7 is suitable to be mounted around an axle having a circular/round cross section.

Figure 8:
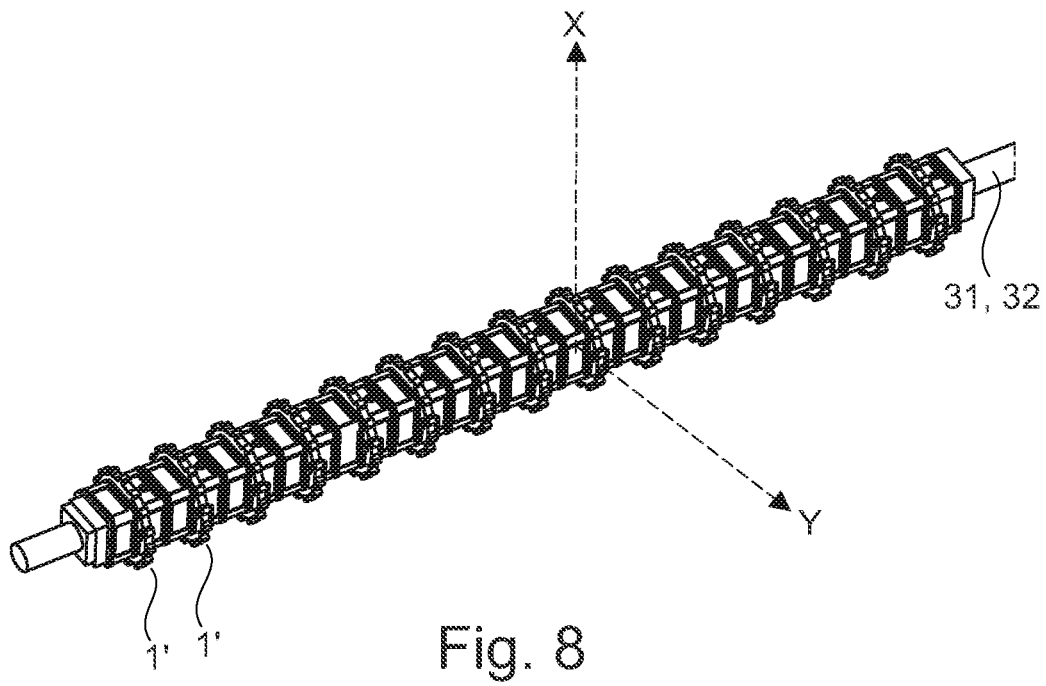
FIGS. 8 and 9 illustrates a conveyor belt drive axle on which is mounted a plurality of multi-part sprocket wheels according to the invention.

In FIG. 8 is illustrated a drive axle 31,32 on which axle 31,32 is arranged a number of sprocket wheels, in this embodiment 15 sprocket wheels 1'. Each sprocket wheel corresponds in principle to the sprocket wheels illustrated in FIG. 1 or 2.

In order to define the extend of the adapter members as independent from the axles 31,32 a common plane is defined. In FIG. 8 is illustrated an "x" axis and an "y" axis, which geometrically illustrates the position of this common plane.

Figure 9:
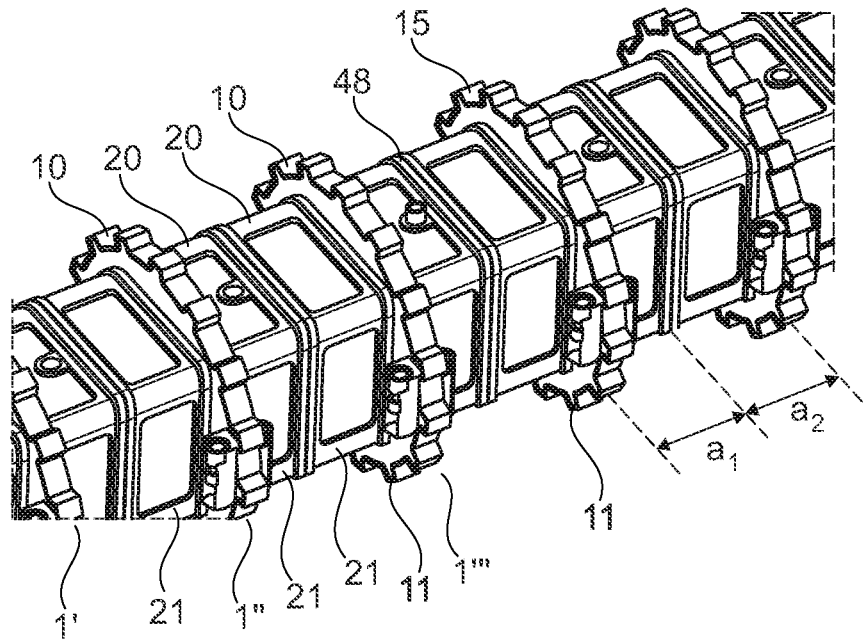

FIG. 9 illustrates a closer view of a section of the axle of FIG. 8. As is illustrated the sprocket wheel 1" has two periphery elements 10,11 assembled as discussed above, around two half adapter members 20,21. The adapter members 20,21 extends a distance $a_1, a_2$ in the longitudinal direction of the axle 31,32 (see FIG. 8). In that way the adapter members 20,21 retains and assures a certain minimum distance between adjacent sprocket wheels 1',1",1''' By this arrangement is assured that the periphery elements 10,11 and thereby also the sprocket teeth 15 are kept at proper mutual distances such that the teeth 15 will engage the modular belt links of the conveyor in the proper designated positions.

In order to retain the sprocket wheels in the correct proper position relative to each other it is only necessary to fix one sprocket wheel, 1,1",1" etc with respect to the axle, as the remaining wheels will be retained in proper relationship due to the extend $a_1,a_1$ of the adapter members 20,21. In this embodiment the sprocket wheel 1''' is fixed by a screw 48, to the axle 31,32.

The extend $a_1,a_1$ on either side of the adapter members 20,21, need not be equal, but may be selected such that proper engagement of the teeth relative to the conveyor belt is achieved. Likewise, for example at the sides of the conveyor belt, the sprocket wheels may be closer to each other, calling for shorter distances $a_1,a_1$, whereas in the middle the distance may be larger.

Although the detailed embodiments relates to sprocket wheels assembled from two periphery elements 10,11 equipped with sprocket teeth 15, assembled around two adapter members 20,21, any number of parts may be used to assemble a multi-part sprocket wheel from.

In the embodiments the adapter members 20,21 are also illustrated as separate elements from the periphery elements. It is also contemplated to provide the adapter members as integrated with the periphery members.

The invention claimed is:

1. Multi part sprocket wheel (1) adapted to engage modular belt modules in a conveyor belt, where said multi part sprocket wheel (1) comprises:
    two or more periphery elements (10,11), each periphery element (10,11) having an outer edge (13) and inner edge (12), where sprocket teeth (15) are provided on the outer edge (13), and where the inner edge (12) has an engagement surface, and where each periphery element (10,11) has means (16,16') for being fastened to and adjacent periphery element (10,11), such that the two or more periphery elements' outer edges (13) forms a full circle;
    one or more adapter members (20,21) where each of said adapter members (20,21) has an outer face (17) and an inner face, said outer face (17) being suitable to firmly engage the inner edge (12) of one or more periphery elements (10,11), and said inner face (12) is adapted to engage a conveyor drive axle
    wherein the sprocket teeth (15) are arranged in a common plane, and that the one or more adapter members (20,21) extends in a direction orthogonal to the common plane of the sprocket teeth (15), optionally on both sides of said common plane, and where the extend $(a_1,a_2)$ corresponds to half the desired distance in use between adjacent sprocket wheels, when mounted on a drive axle (31,32).

2. Multi part sprocket wheel according to claim 1 wherein the adapter members' inner face (12) is provided with means for fastening the adapter member (20,21) to the conveyor drive axle (31,32).

3. Multi part sprocket wheel according to claim 1 wherein the means (16,16') for fastening adjacent periphery elements (10,11) includes four flanges extending orthogonal to the common plane and arranged in both distal ends of each periphery element (10,11), where each flange is provided with recesses alternative apertures, suitable to receive and hold a bolt (25) and/or nut (26).

4. Multi part sprocket wheel according to claim 1 wherein the periphery element (10,11) and the adapter members (20,21) are made as one integral unit, such that a sprocket wheel (1) is assembled from two or more integral units.

5. Multi part sprocket wheel according to claim 1 wherein the adapter members' extend $(a_1,a_2)$ orthogonal to the common plane of the sprocket teeth, on either side of said plane is equal or un-equal.

6. Multi part sprocket wheel system, comprising:
    a selection of periphery elements (10,11) according to claim 1 where a plurality of types are provided, where the periphery elements (10,11) are provided in different sizes, such that when one type of periphery elements (10,11) are assembled they form a full circle with one diameter, and when a second type of periphery elements (10,11) are assembled they form a circle with a second diameter and so forth, and where all periphery elements (10,11) has identical inner edges;
    one or more types of adapter members (20,21), where each type of adapter members is suitable to be mounted with at least one type of periphery elements where said adapter members (20,21) has an outer face (17) and an inner face, said outer face (17) being suitable to firmly engage the inner edge (12) of one or more periphery elements (10,11) of the same type and where said inner face (12) is adapted to engage a conveyor drive axle.

7. Multi part sprocket wheel system according to claim 6, wherein different types of periphery elements are provided with different number of sprocket teeth or the same number of sprocket teeth.

8. Drive axle suitable to be mounted in a conveyor structure where on said drive axle 31,32 one or more multi-part sprocket wheels (1) according to claim 1 are arranged, spaced in the longitudinal direction of said axle by means of the extend $(a_1,a_2)$ of the adapter members (20,21).

* * * * *